United States Patent [19]

Grall

[11] Patent Number: 4,779,239

[45] Date of Patent: Oct. 18, 1988

[54] SONAR TRANSDUCER SYSTEM FOR IMAGE FORMATION

[75] Inventor: Georges Grall, Le Conquet, France

[73] Assignee: Thomson-CSF, Paris, France

[21] Appl. No.: 663,165

[22] Filed: Oct. 22, 1984

[30] Foreign Application Priority Data

Oct. 25, 1983 [FR] France ................................ 83 16994

[51] Int. Cl.[4] ............................ G01S 9/66; G01S 9/68

[52] U.S. Cl. ........................................ 367/88; 367/104; 367/120

[58] Field of Search ................. 367/88, 104, 131, 154, 367/155, 120

[56] References Cited

U.S. PATENT DOCUMENTS

| | | | |
|---|---|---|---|
| 2,865,014 | 12/1958 | Malm | 367/113 |
| 3,121,855 | 2/1964 | Thiede | 367/104 |
| 3,979,711 | 9/1976 | Maginness et al. | 367/155 |
| 4,151,834 | 5/1979 | Sato et al. | 367/104 |
| 4,271,490 | 6/1981 | Minohara et al. | 367/154 |
| 4,300,215 | 11/1981 | Jones | 367/88 |
| 4,479,206 | 10/1984 | Granberg | 367/104 |
| 4,511,998 | 4/1985 | Kanda et al. | 367/104 |
| 4,601,024 | 7/1986 | Broding | 367/88 |

*Primary Examiner*—Nelson Moskowitz
*Assistant Examiner*—Ian J. Lobo
*Attorney, Agent, or Firm*—Oblon, Fisher, Spivak, McClelland, & Maier

[57] ABSTRACT

A sonar transducer comprising a stack of an even number of antennae with identical linear networks. The stack is driven by a reciprocating rotary movement of low amplitude, with the antennae alternately emitting and receiving with each half wavelength of the rotary movement. The emitting antennae as well as the receiving antennae are mutually staggered by an angle equal to the angle of rotation of the assembly. The assembly of receiving antennae are staggered with respect to the assembly of emitting antennae by an angle equal to the phase delay of an emission lobe with respect to the corresponding reception lobe.

3 Claims, 4 Drawing Sheets

SONAR TRANSDUCER SYSTEM FOR IMAGE FORMATION

BACKGROUND OF THE INVENTION

1. Field of the Invention

The present invention relates to a sonar transducer system for image formation.

2. Discussion of Background

An image forming sonar is a sonar device operating at a frequency of a few megahertz for visualizing objects placed on the sea bed. It replaces a television camera when the water is too cloudy. An important part of such a sonar is the transducer transmitting and receiving system. This transducer system must provide a wide sector of observation with high resolution.

A known transducer system has a single receiving antenna and a single transmitting antenna which covers the whole sector of observation with sound. The reception channels are preformed electronically and for each channel a different delay must be provided for each transducer signal. To cover for example a sector of observation of 45° lateral deflection with a beam having a lateral width of 0.6°, 75 channels must be formed, which would require a very expensive electronic processing circuit. Furthermore, the sonar system has a reduced antenna gain with respect to a directional antenna system which causes an increase in the electric power required for its use.

It is also known to preform channels geometrically by using as many antennae as there are channels and by staggering them angularly by the desired value (0.6°) for the above mentioned example. For a large number of channels, this technique becomes too expensive.

Finally, it is also known not to preform channels and to cover the space with sound by a mechanical sweep using a single pair of transmitting and receiving antennae effecting an alternate sweep; however, then the rate of image formation is insufficient.

SUMMARY OF THE INVENTION

The present invention provides a sonar transducer system for image formation which is simple and inexpensive to construct, which does not complicate the associated electronic circuits and which allows a sufficient image rate to be obtained while having a relatively wide sector of observation with high resolution.

The transducer system of the invention utilizes several transmitting and receiving antennae controlled by a motor which causes them to effect alternate sweeping.

In a preferred embodiment of the invention, the transducer system comprises an even number of antennae formed from superimposed linear arrays operating alternately by halves, at each change of direction of rotation, for transmission mission and reception. These antenna are mutually offset angularly by angles which are mutually equal as well as being equal to the rotary alternating sweep angle to which the assembly of antennae is subjected.

BRIEF DESCRIPTION OF THE DRAWINGS

The present invention will be better understood from reading the detailed description of one embodiment, taken as non limiting example illustrated by the accompanying drawings in which.

DESCRIPTION OF THE PREFERRED EMBODIMENT

Figure 1:
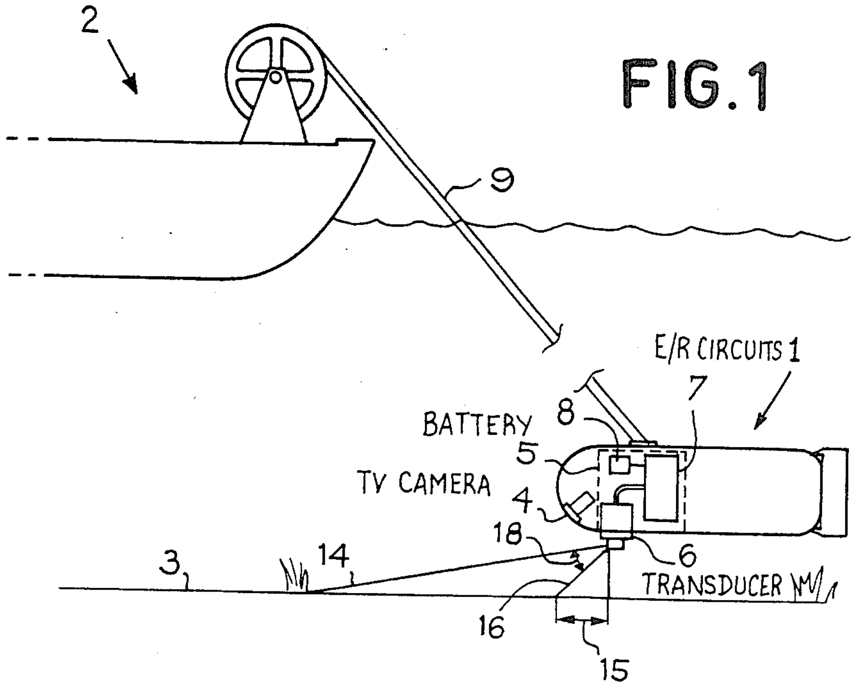
FIG. 1 is a simplified schematical view of an underwater exploration craft comprising a sonar transducer system for image formation.

In FIG. 1 there is shown, in a simplified way an uninhabited craft 1 for exploring sea beds, generally called a "fish"This craft may be self-propelled, or towed by a surface boat 2 as shown in FIG. 1.

When the conventional hull sonar (not shown) of the boat has located and classified an object resting on the sea bed 3, the "fish" carries out a more accurate identification, and the "fish" must then be located accurately with respect to this object. For this the "fish" comprises a TV camera 4 and a high frequency sonar 5 comprising essentially a transducer system 6 and conventional associated electric emission, reception and processing circuits, these circuits being supplied with power from a battery 8.

A cable 9 connects the "fish " 1 to the boat 2. Through this cable travel the video signals delivered by the camera 4 and the sonar signals delivered by the sonar 5, as well as possible control signals intended for the "fish". The video and sonar signals transmitted by cable 9 are displayed on board boat 2 on a standard TV monitor (not shown) whose operator controls the switching to the video or sonar signals.

Figure 2:
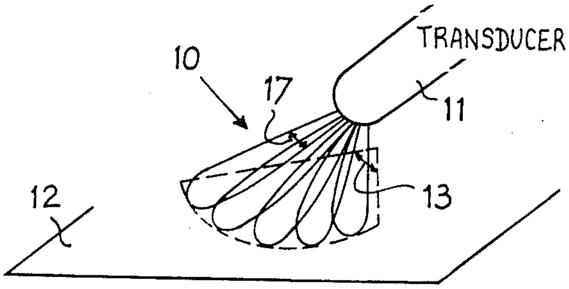
FIG. 2 is a representative schematical perspective view of sonar beams transmitted by a transducer with several transmission channels.

In FIG. 2 there has been symbolized an array of beams 10 emitted by a transducer 11 having several emission and reception channels (there are five channels for each direction and so five emission beams in the case of FIG. 2). These beams are emitted obliquely (with respect to the vertical) and cover the sea bed with sound (a portion 12 of which is shown and to be assumed substantially horizontal and flat along a sector of observation having, in the horizontal plane, an angle 13.

Taking into account the movements of the "fish", it has been determined that the sonar system should produce optimally, four images per second, which value will be adopted in the rest of the description, this value being in no way limiting.

For a preferred embodiment of the invention, the following typical values were adopted: angle 13 (FIG. 2); 45°. Resolution, at 10 meters from the transducer: a square area with a side of 10 cms. Maximum distance between the transducer and the point of impact of the end of a beam on the sea bed (at a distance shown at 14 in FIG. 1): 10 meters, the beam being defined, by convention, by a three decibel attenuation contour of the main lobe of the directivity diagram. Minimum distance between the vertical passing through the emission face of the transducer and the point of impact of the end of a beam, below which there is no need to locate objects: 2 meters (distance shown at 15 in FIG. 1). A minimum distance 16 between the transducer and the point of impact of the beam corresponds to this minimum distance 15.

The resolution chosen requires, at the maximum distance of 10 meters mentioned above, a width in the horizontal plane of each of the beams of assembly 10 (see FIG. 2) of 1/100 rd, i.e. 0.6°, the width in the horizontal plane being the value of the opening angle 17 of the conventional beam (i.e. considered in accordance with the above mentioned convention). The maximum 14 and minimum 16 oblique distances define an elevational angle 18 of 30°.

Under the above mentioned conditions, the number of channels to be formed is 45°/0.6°=75 channels.

To avoid the drawbacks of the known transducer systems mentioned above, the invention proposes preforming geometrically a small number of channels, five in a preferred embodiment, for emission and reception, and causing the transducer system to effect an alternate mechanical sweep. of low amplitude, 9° in one direction and 9° in the opposite direction for the preferred embodiment, so as to satisfy he required image rate, while having characteristics of the sweep motor which are not very exacting.

Figure 3:
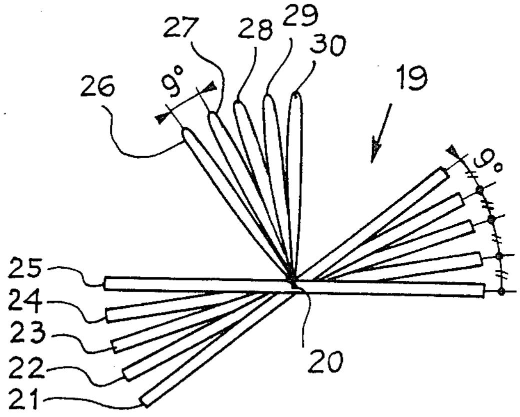
FIG. 3 is a simplified top view of the antennae of a transducer system in accordance with the invention.

In FIG. 3 is shown a simplified top view of the linear arrays of the transducer 19 in the preferred embodiment of the invention. This transducer 19 comprises 10 antennae. having identical superimposed arrays, the middle being situated on an axis perpendicular to the plane of FIG. 3, the trace 20 of which is shown in this Figure. Five of these antennae operate for emission and the other five for reception. In FIG. 3 five antennae arrays referenced 21 to 25 can be seen, for example the five emission arrays disposed above the five reception arrays, these latter being respectively oriented in the horizontal plane in the same way as the emission arrays, and being therefore occluded by them in the top view of FIG. 3. The five arrays 21 to 25 are mutually staggered by an angle of 9°. Each of the networks 21 to 25 emits a directional ultrasonic beam, the beams being respectively referenced 26 to 30. The direction of each beam is perpendicular to the longitudinal axis of the corresponding linear array and to axis 20, and these arrays are mutually staggered by an angle of 9°. The assembly 19 of the ten antennae rotate about axis 20 with an alternative movement of an amplitude of 9° (9° in one direction and 9° in the other direction). Consequently, this alternate movement allows the angular field of 45° required to be completely covered.

Each linear array is formed from several elementary emitting or receiving transducers, depending on the case, whose electric signals at emission or reception are added by a simple electric connection between the elementary transducers of the same linear array.

In the embodiment described below, the active face of each array has a length of 60 $\lambda$ and a height of 2 $\lambda$. Such an array produces, at the operating frequency of 2 MHZ (the operating frequency is advantageously between 1 and 5 MHZ), a radiation diagram whose angular width (at 3 dB attenuation) in the horizontal plane is of the order of 0.95°, and of the order of 30°in elevation. The angular resolution required in the horizontal plane of 0.60° is obtained by the product of the emission and reception diagrams.

Because of the rotation of the transducer system, a phase delay occurs in the emission beam with respect to the corresponding reception beam. This phase delay depends on the speed of rotation of the system and on the distance from the target. In order to have coincidence between the emission and reception beams, the receiving arrays are staggered angularly with respect to the corresponding emitting arrays by causing them to undergo a slight rotation of angle $\lambda$ about the axis 20 (which strictly means that, in the top view of FIG. 3, the receiving arrays are not completely masked by the emitting arrays, but project slightly therefrom) in order to provide at emission a phase advance equal in absolute value to the delay. In the embodiment described, for which the maximum distance D referenced 14 is 10 m, and the speed of rotation $\omega$ of the transducer system is 45°/s (so as to obtain four images per second), the stagger angle is $\alpha=2D.\omega/C=0.6°$ (C being the speed of sound in water). Each array is alternately an emitter and a receiver depending on the direction of rotation, so as to ensure the phase advance on emission. Means, known per se, are provided for alternately switching the emission and reception channels of the sonar to the corresponding arrays.

Figure 4:
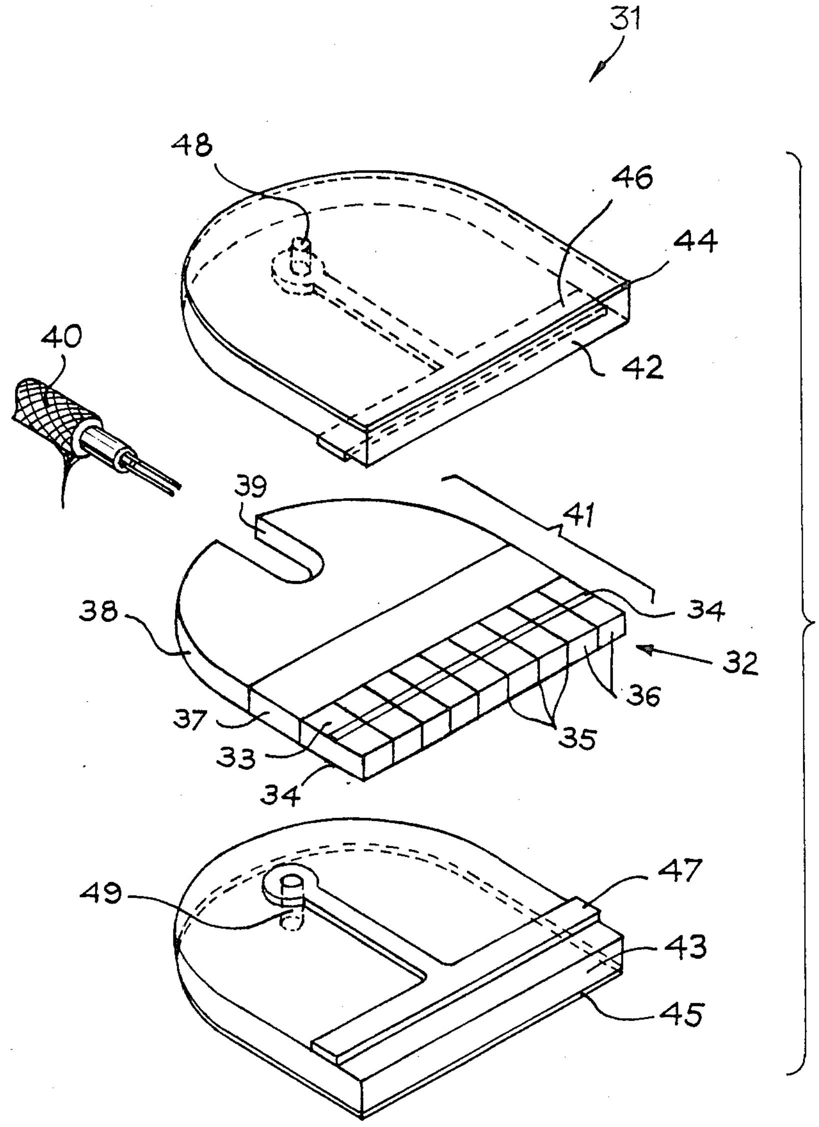
FIG. 4 is an exploded perspective view of an antenna in accordance with the invention.

In FIG. 4 there is shown an exploded view of a preferred embodiment of a linear network antenna 31 in accordance with the invention.

Antenna 31 comprises a linear array 32 formed from a bar of piezoelectric ceramic 33 on the upper and lower side faces of which is disposed by metallization a longitudinal ribbon 34 of an electrically conducting material. Fine notches 35 are formed in bar 33. They are spaced regularly apart perpendicularly to the longitudinal axis of the bar, these notches cutting the ribbons 34. Thus an array is formed of elementary transducers 36. In FIG. 4 nine transducers have been shown. For example, bar 33 has a length of $60\lambda=0.45$ mm (at the frequency of 2 MHZ, the speed C of sound in water is 1500 m/s) and a thickness of $2\lambda=1.5$ mm. The side face of bar 33 opposite its active face is bonded to a bar 37, made from a reflecting material, having the same length and thickness as it. Bar 37 is for example made from a porous synthetic material such as "Klegecel". The assembly of bars 33 and 37 is bonded to the front flat face of a semicircular insulating wafer 38 made from epoxy and of the same thickness as these two bars. Wafer 38 has in its rear part a notch 39 for introducing therein the end of an electric twinflex shielded connecting cable 40 and for passing the axis of rotation therethrough. Plate 41 formed by wafer 38 extended by bars 37 and 38 is sandwiched between two wafers 42 and 43 of the same form as it and of a thickness of 0.6 mm for example. The two wafers 42 and 43 are coated on their large external faces with an electro-magnetic metal shielding film 44, 45 respectively, made for example from copper. The internal faces (i.e. those applied to plate 41) of wafers 42 and 43 comprise a metallization 46, 47 respectively, in the form of a T whose "horizontal" bar is applied to the corresponding metallization 34 for establishing an electric contact, and whose "vertical" bar extends as far as notch 39 where it ends in an eyelet in the center of which is formed a blind hole 48, 49 respectively, for soldering thereto each of the two wires of conductor 40 whose shielding braid is connected to shields 44 and 45.

The assembly of the parts of antenna 31, once mounted and bonded, is coated with a neoprene sheath (not shown) providing sealing of the assembly.

The transducer of the invention is formed by stacking five pairs of antennae such as antenna 31 described above, the pairs being mutually staggered by 9°, and the two antennae of a pair being staggered by 0.6° from each other.

In a variant, two stacks may be formed each comprising five antennae staggered with respect to each other by 9°, the two stacks being staggered from each other by 0.6°.

The five output signals from the arrays operating in the reception mode are processed separately in a way known per se by amplification, filtering, detection and integration then are multiplexed for transmission to the surface boat 2 via cable 9. The multiplexed signals are then digitized and stored in a memory whose writing addresses take into account the fact that the samples to be stored represent data coming from channels offset mutually by an angle of 9°. This memory is filled in the time interval corresponding to the time for sweeping the 9° sector, i.e. 200 ms since the speed of rotation chosen in the example described is 45°/s. This memory is read again at the high-speed reading television standard for display on said TV monitor. In one embodiment, the antenna gain is about 32 dB, which allows the five parallel emission arrays to be supplied with an electric power of about 3OW, each array receiving about 6W.

Figure 5:
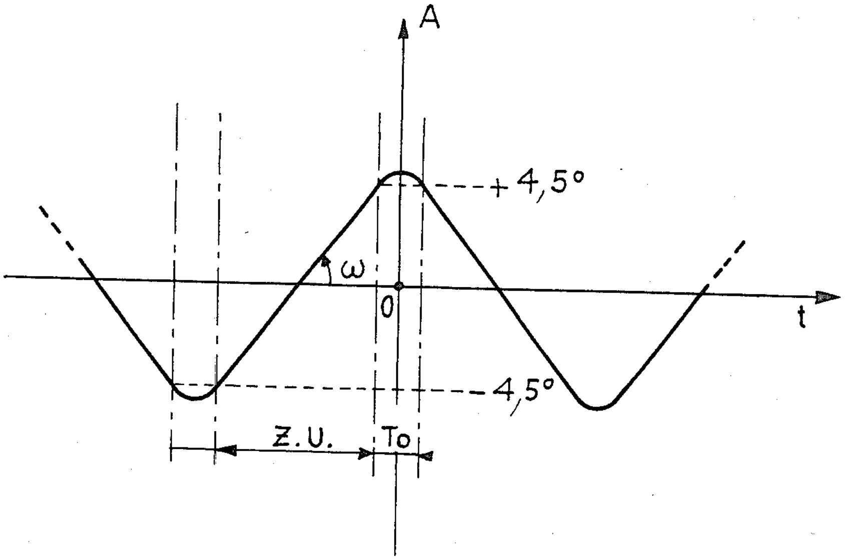
FIG. 5 is a diagram, as a function of time, of the angular position of the transducer system of the invention when it provides alternate sweeping.
Figure 6:
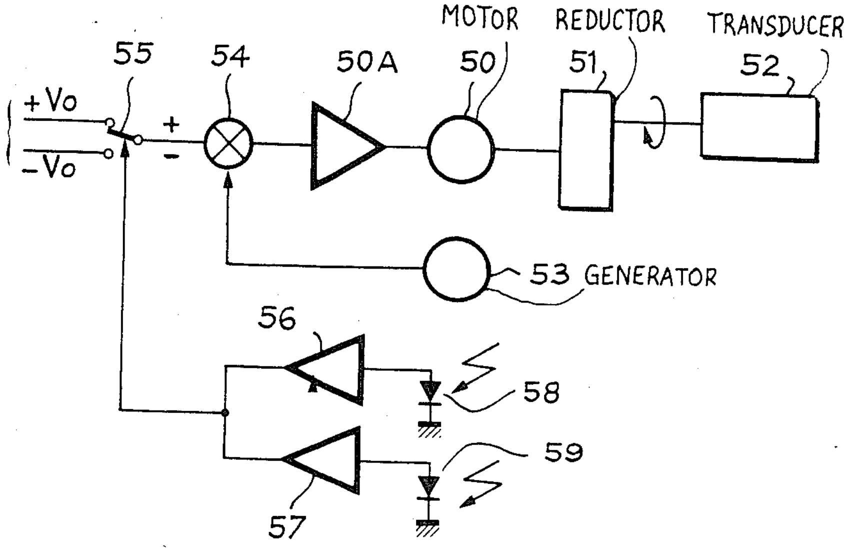
FIG. 6 is a simplified electric diagram of a circuit for servo-control of the drive motor of the transducer system of the invention and, FIG. 7 is a sectional view showing one example of fitting the motor of FIG. 6 into an exploration craft.

The diagram in FIG. 5 shows the evolution as a function of time t of the angular position A of the transducer of the invention during operation, i.e. when it carries out alternate sweeping at the angular speed of 45°/s, being driven by a motor-driven reducer with speed dependent control. The curve of FIG. 5 has the form of a regular saw tooth and is symmetrical with respect to a time axis Ot situated at half the angular movement, which saw-tooth has a slope with an absolute value of 45°/s and apexes which are rounded because of the time tO required for establishing the speed of rotation during the change of direction of rotation. On each side of axis the linear part of the curve is located between the angular positions −4.5° and +4.5°, in a useful zone Z.U of a width of 200 mS. In FIG. 6 is shown one embodiment of the circuit for the servo-control of motor 50 driving the transducer of the invention. Motor 50 drives transducer 52 through a reducing unit 51.

The reducing unit 51 has a reduction ratio of 1/25 for example. Motor 50 also drives a generator 53 whose output voltage is fed to a comparator 54 receiving on the one hand from a switch 55 a reference voltage switched alternately (at a period equal to Z.U +To) between the values +Vo and -Vo corresponding to the voltages supplied by generator 53 for an angular movement of +4.5° and −4.5° (with respect to a mid movement angular posrtion) of transducer 52. The output voltage of 54 is amplified by an amplifier 50A and fed to motor 50. The switching of switch 55 is controlled by two amplifiers 56, 57 each connected to a lateral deflection optical stop comprising photosensitive elements 58, 59 respectively, determining said angular movements of +4.5° and −4.5°.

Figure 7:
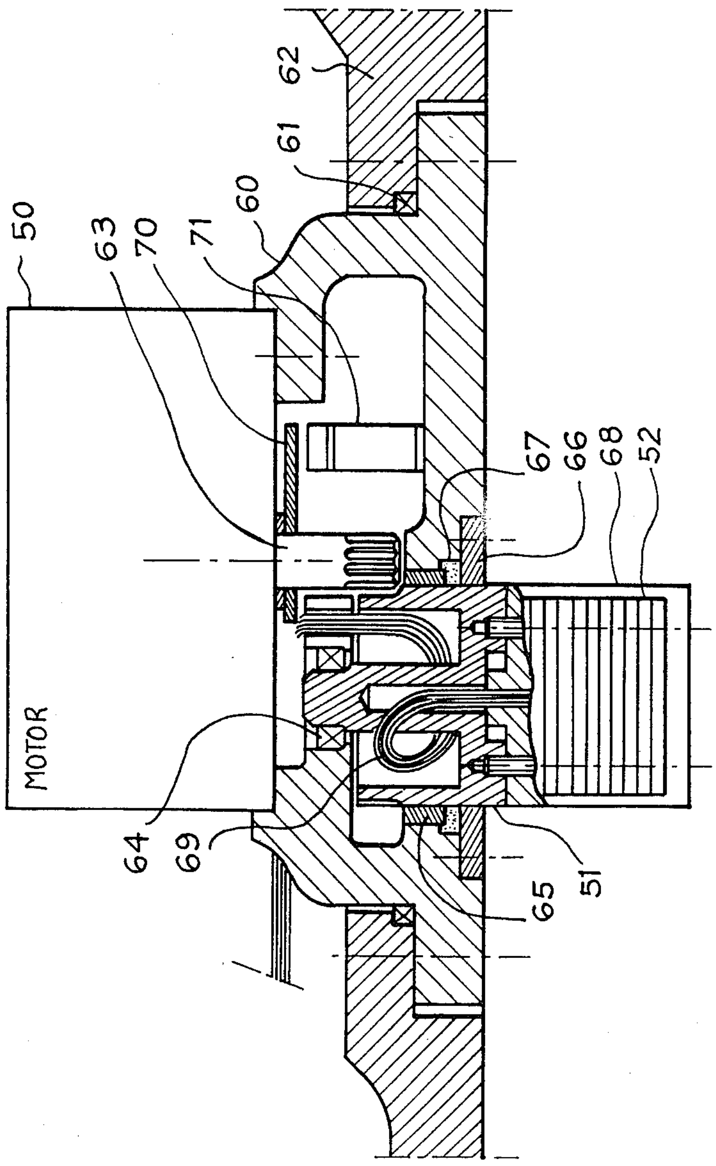

In FIG. 7 is shown one example of fitting the motor and transducer in the "fish". The characteristics of the motor selected are:

rated torque: 3 cm.N
mechanical time constant: =4.5 ms
inertia: Ic=100 g.cm$^2$

Taking into account the reducing unit, with. a ratio of 1/25, the time constant of the mechanical system is practically equal to that of the rotor of the motor, i.e. $\tau \approx = 5$ ms. The maximum acceleration is equal to $-2\omega/\tau$, i.e. 314 rd/s$^2$, supplying an inertia torque Ci$=$Ic.$2\omega/\tau$=0.35 cm.N. This torque is low with respect to that of the motor selected which must essentially overcome the dry friction torques.

As shown in FIG. 7, motor 50 is fixed to removable support 60 itself sealingly fixed (seal 61) to the shell 62 of the "fish" in an appropriate position. The output shaft 63 of motor 50 drives the reducing unit 51 supported at the end by a bearing 64 and guided laterally by a guide ring 65, bearing 64 and ring 5 being integral with support 60. The reducing unit 51 is housed in a cavity of support 60, which is sealingly closed by a plate 66 with a bore through which the reducing unit 51 projects slightly beyond support 60. The transducer 52 is fixed to the end of reducing unit 51 and is protected by a radome 68 which is sealingly fixed to the projecting end of reducing unit 51. The electric connection cable 65 of transducer 52 passes through the hollow shaft of reducing unit 51, exits laterally therefrom and is connected to the electronic circuit 7 of the "fish" (see FIG. 7) while forming a loop for the alternate rotation of the transducer.

A plate 70 is fixed to the shaft 63 of motor 50 and cooperates with two optical detectors, for example of the reflection type, a single one of which, referenced 71, is visible in FIG. 7, these two detectors being fixed to support 60 at appropriate positions. These two detectors comprise the photosensitive elements 58 and 59 shown in FIG. 6.

What is claimed is:

1. A transducer system for an image forming sonar for sweeping on the sea bed a sector having a sector angle $\beta$, which comprises a vertical rotating shaft, a first plurality of n acoustic emitting or receiving first antennae producing a radiation pattern such that the angular width of said pattern is substantially ten times less than $\beta/n$ and said first antennae being mutually off-set by a first off-set angle equal to $\beta/n$, a second plurality of acoustic emitting or receiving second antenna fixed onto said shaft, said second plurality being identical to said first plurality and each of said first antennae corresponding respectively to each of said second antennae so that each antenna receives the acoustic signals emitted by its corresponding antenna, means for rotating said shaft alternately in one direction then in the other through an angle equal to $\beta/n$ at a constant given angular speed, this rotation introducing a phase delay between the emission and the reception of said acoustic signals, said second plurality of second antennae being fixed onto said shaft with a second off-set angle with respect to said first plurality of first antennae in order to compensate said phase delay; the emitting and receiving functions of said first and second antennae being interchanged at the time when the direction of rotation of said shaft is changed; wherein each of said antennae comprises: a parallelepipedic bar made from piezoelectric ceramic comprising fine evenly spaced slits perpendicular to the bar for forming said elementary transducers; two first ribbon-like metallizations disposed longitudinally above and below the bar; a reflector made from a porous material fixed to the rear of the bar and of the same thickness as this latter; a first semi-circular insulating wafer fixed to the rear of the reflector and of the same thickness as this latter; two second plates, shielded externally, sandwiching the assembly formed by the bar, the reflector and the first wafer; two second T shaped metallizations deposited on the internal faces of the second wafers, the upper bar of each T bearing on that of the first metallizations which is opposite the second metallization forming this T and the vertical bar to the T extending rearwardly of the second wafer which supports it; a twin flex conductor in which each wire is connected to one of the second metallizations.

2. The system as claimed in claim 1, wherein, with the speed of rotation of the shaft being $\omega$, the speed of sound in water being C and the maximum distance of observation being D, said second off-set angle is equal to 2 D $\omega$/C.

3. The system as claimed in claim 2, wherein $\alpha=45°$, n=5, D=10 m and second off-set angle is equal to 0.060°.

* * * * *